US012798278B2

(12) United States Patent
Uchida

(10) Patent No.: US 12,798,278 B2
(45) Date of Patent: Nov. 17, 2026

(54) SHEET PROCESSING SYSTEM, METHOD FOR CONTROLLING SHEET PROCESSING SYSTEM, AND STORAGE MEDIUM

(71) Applicant: CANON KABUSHIKI KAISHA, Tokyo (JP)

(72) Inventor: Tatsuro Uchida, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 273 days.

(21) Appl. No.: 18/621,908

(22) Filed: Mar. 29, 2024

(65) Prior Publication Data

US 2024/0326504 A1 Oct. 3, 2024

(30) Foreign Application Priority Data

Mar. 31, 2023 (JP) ................................ 2023-058257

(51) Int. Cl.

| | |
|---|---|
| ***B65H 37/02*** | (2006.01) |
| ***B42C 1/12*** | (2006.01) |
| ***B65H 33/00*** | (2006.01) |
| ***B65H 37/04*** | (2006.01) |

(52) U.S. Cl.

CPC ............... *B42C 1/12* (2013.01); *B65H 33/00* (2013.01); *B65H 37/04* (2013.01); *B65H 2301/51432* (2013.01); *B65H 2301/5162* (2013.01); *B65H 2551/18* (2013.01)

(58) Field of Classification Search

CPC .......... B42C 1/12; B65H 37/02; B65H 37/04; B65H 2551/18; B65H 2301/43827; B65H 2301/43822; B65H 2301/43823; B65H 2301/5162; B65H 2301/51432; B65H 2301/51614

USPC ....................................................... 270/58.08

See application file for complete search history.

(56) References Cited

U.S. PATENT DOCUMENTS 8,838,014 B2 * 9/2014 Matsue .............. G03G 15/6544 399/408
9,110,425 B2 * 8/2015 Watanabe .......... G03G 15/6544
9,713,933 B2 * 7/2017 Umeda ................... B42C 19/02
9,764,582 B2 * 9/2017 Taguchi ................. B65H 45/18

FOREIGN PATENT DOCUMENTS

JP 2004209859 A 7/2004

* cited by examiner

*Primary Examiner* — Leslie A Nicholson, III
(74) *Attorney, Agent, or Firm* — Canon U.S.A., Inc. IP Division

(57) ABSTRACT

A system that, in the case of printing images on sheets exceeding a predetermined number of sheets, is capable of easily outputting a sheet bundle where pressure-bonding has been applied is provided. A method for controlling a sheet processing system includes: conveying a sheet with a printed image, adhering an edge of a plurality of sheets conveyed in the conveying, and applying control to adhere, in the adhering, an additional sheet conveyed in the conveying to a sheet bundle including the plurality of sheets adhered in the adhering.

17 Claims, 13 Drawing Sheets

Z (HEIGHT DIRECTION)
X (WIDTH DIRECTION)
Y (CONVEYANCE DIRECTION)
1171
1168
1167
1169
1170
1169a
1172a,
1172b
S1-S5
1180

1171
1168
1167
1169
1170
1172a,
1172b
S1-S5
1180

1167
1171
1168
1169
1170
1172a,
1172b
S1-S5
1180

1167
1171
1168
1169
1170
1172a,
1172b
S6-S10
S1-S5
1180

1171
1168
1167
1169
1170
1172a,
1172b
S6-S10
S1-S5
1180

1167
1171
1168
1169
1170
1172a,
1172b
S6-S10
S1-S5
1180

SHEET PROCESSING SYSTEM, METHOD FOR CONTROLLING SHEET PROCESSING SYSTEM, AND STORAGE MEDIUM

BACKGROUND

Field of the Disclosure

The present disclosure relates to a sheet processing system for adhering multiple sheets, a method for controlling a sheet processing system, and a storage medium.

Description of the Related Art

Techniques for pressure-bonding multiple sheets together are known.

Japanese Patent Laid-Open No. 2004-209859 describes a configuration in which sheets, with toner applied as an adhesive, are thermocompressed by heating and pressurizing the area where the toner has been applied.

In a printing system for pressure-bonding multiple sheets together, there is an upper limit to the number of sheets in a sheet bundle that can be output in one batch. When the number of sheets exceeds the upper limit and the sheets are output without executing pressure-bonding as specified by the user, each sheet remains unbonded, resulting in an increased workload for pressure-bonding these unattached sheets together.

SUMMARY

The present disclosure provides a sheet processing system including a conveyance unit configured to convey a sheet with a printed image, an adhesion unit configured to adhere an edge of a plurality of sheets conveyed by the conveyance unit, and a control unit configured to apply control to adhere, using the adhesion unit, an additional sheet conveyed by the conveyance unit to a sheet bundle including the plurality of sheets adhered by the adhesion unit.

Further features of the present disclosure will become apparent from the following description of embodiments with reference to the attached drawings.

DESCRIPTION OF THE EMBODIMENTS

First Embodiment

Hereinafter, embodiments of the present disclosure will be described in detail with reference to the drawings. Note that the following embodiments are not construed to limit the disclosure according to the claims, and not all of the combinations of features described in the embodiments are essential to the solution of the disclosure.

Figure 1:
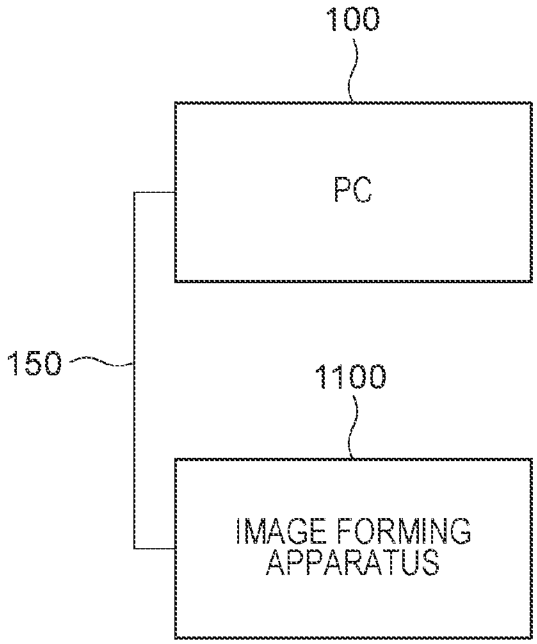
FIG. 1 is a diagram illustrating an image forming apparatus and a personal computer (PC) connected to each other.

FIG. 1 is a block diagram of a printing system according to a first embodiment. The printing system includes a personal computer (PC) 100 and an image forming apparatus 1100, which are connected by a communication line 150 such as a local area network (LAN) or a universal serial bus (USB). Note that the image forming apparatus 1100 broadly includes apparatuses for forming (recording) images on sheets (recording media), such as copy machines, multifunction machines, commercial printing machines, single-function printers, and the like. In addition, the image forming apparatus 1100 may be a system (image forming system) in which an image forming apparatus main body that forms images on sheets is coupled with equipment such as a sheet processing apparatus and a sheet feeding apparatus.

Note that the PC 100 is an example of an information processing apparatus, which may be a mobile terminal (an electronic device such as a personal digital assistant (PDA) or a mobile phone).

Figure 2A:
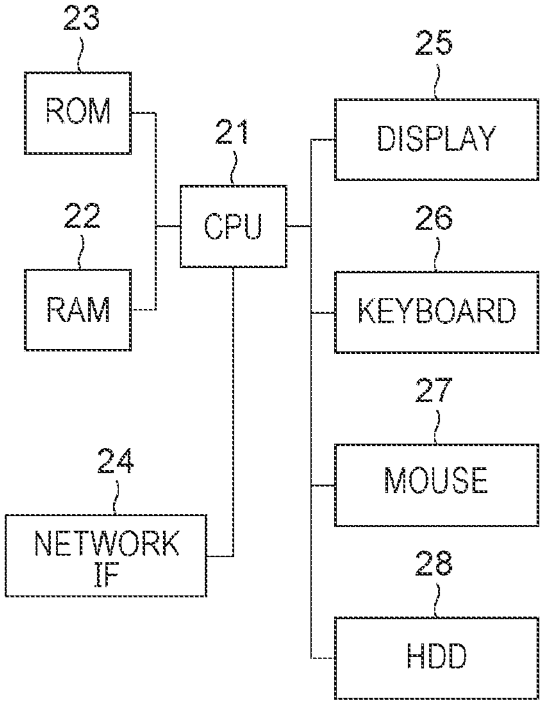
FIG. 2A is a block diagram of the PC.

FIG. 2A is a block diagram illustrating the main hardware configuration of the PC 100.

The PC 100 includes a central processing unit (CPU) 21, a random access memory (RAM) 22, a read-only memory (ROM) 23, a network interface (IF) 24, a display 25, a keyboard 26, a mouse 27, and a hard disk drive (HDD) 28. These are connected via the CPU 21.

The CPU 21 controls the entire computer using programs and data stored in the RAM 22 and ROM 23, and performs each of the processes described below.

The RAM 22 has an area for temporarily recording programs and data loaded from the HDD 28. The RAM 22 also stores programs and data received from external devices such as the PC 100 via the network IF 24, and has a work area used by the CPU 21 when executing various processes.

The ROM 23 stores the boot program, configuration data for each hardware device that makes up the PC 100, and so on.

The network IF 24 functions as an interface unit for connecting the PC 100 to the communication line 150, and, using the network IF 24, the PC 100 can perform data communication with external devices via the communication line 150. Any type of the network IF 24 is acceptable.

The display 25 is an example of a display unit and what is displayed on the display 25 is controlled by the CPU 21. Note that the CPU 21 may cooperate with a display microprocessor to control what is displayed on the display 25. The display 25 is connected to a device such as a cathode ray tube (CRT) or liquid crystal display, and can display the processing results of the CPU 21 (e.g., a print settings screen described later) in the form of images, text, and the like.

The keyboard 26 and the mouse 27 are each an example of an input device, and each function as a user interface for inputting various instructions to the CPU 21. Note that the types of input devices are not limited to these devices.

The HDD 28 stores the operating system (OS), a document creation program, and a printer driver. Other storage devices, such as a solid state drive (SSD), are also acceptable as long as they can store data.

The PC 100 reads the installed operating system and programs into the RAM 22. After creating a document, if the document is to be printed, the PC 100 sends printing information to the image forming apparatus 1100 via the communication line 150 through the printer driver.

Figure 2B:
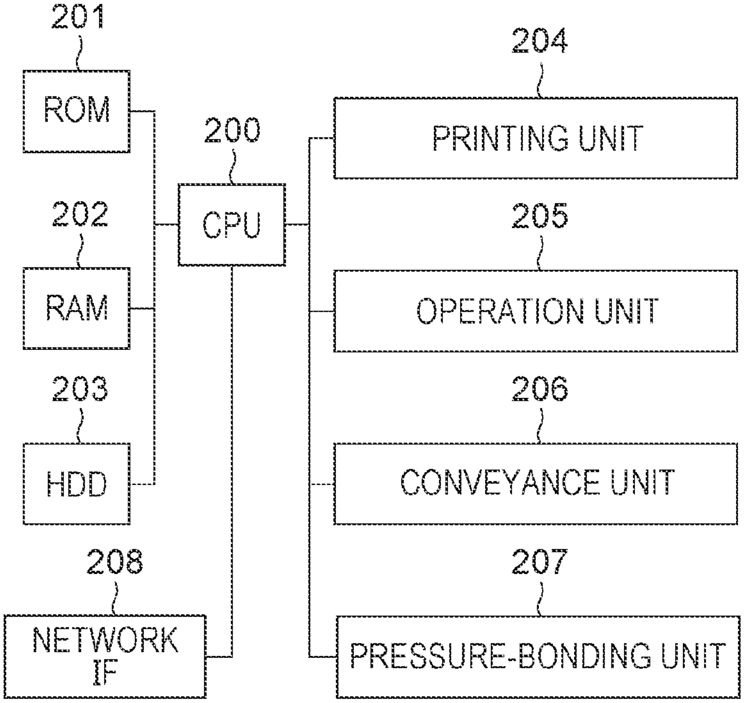
FIG. 2B is a block diagram of the image forming apparatus.

FIG. 2B is a diagram illustrating the control configuration of the image forming apparatus 1100. The image forming apparatus 1100 has a CPU 200 as a central processing unit. The CPU 200 is connected to a ROM 201, a RAM 202, and an HDD 203 by a bus, and the CPU 200 executes various programs stored in the ROM 201 and performs image forming operations. In addition, various control data used by the CPU 200 during image forming operations is stored in the RAM 202. The image forming apparatus 1100 also has the HDD 203 for retaining printing data. Upon receiving an image forming operation start request via an operation unit 205 or a network IF 208, the CPU 200 implements control of a conveyance unit 206 to perform a sheet conveying operation, and implements control of a printing unit 204 to perform a printing operation.

Moreover, depending on the settings, the CPU 200 implements control of a pressure-bonding unit 207 to perform a pressure-bonding operation on sheets.

Figure 3:
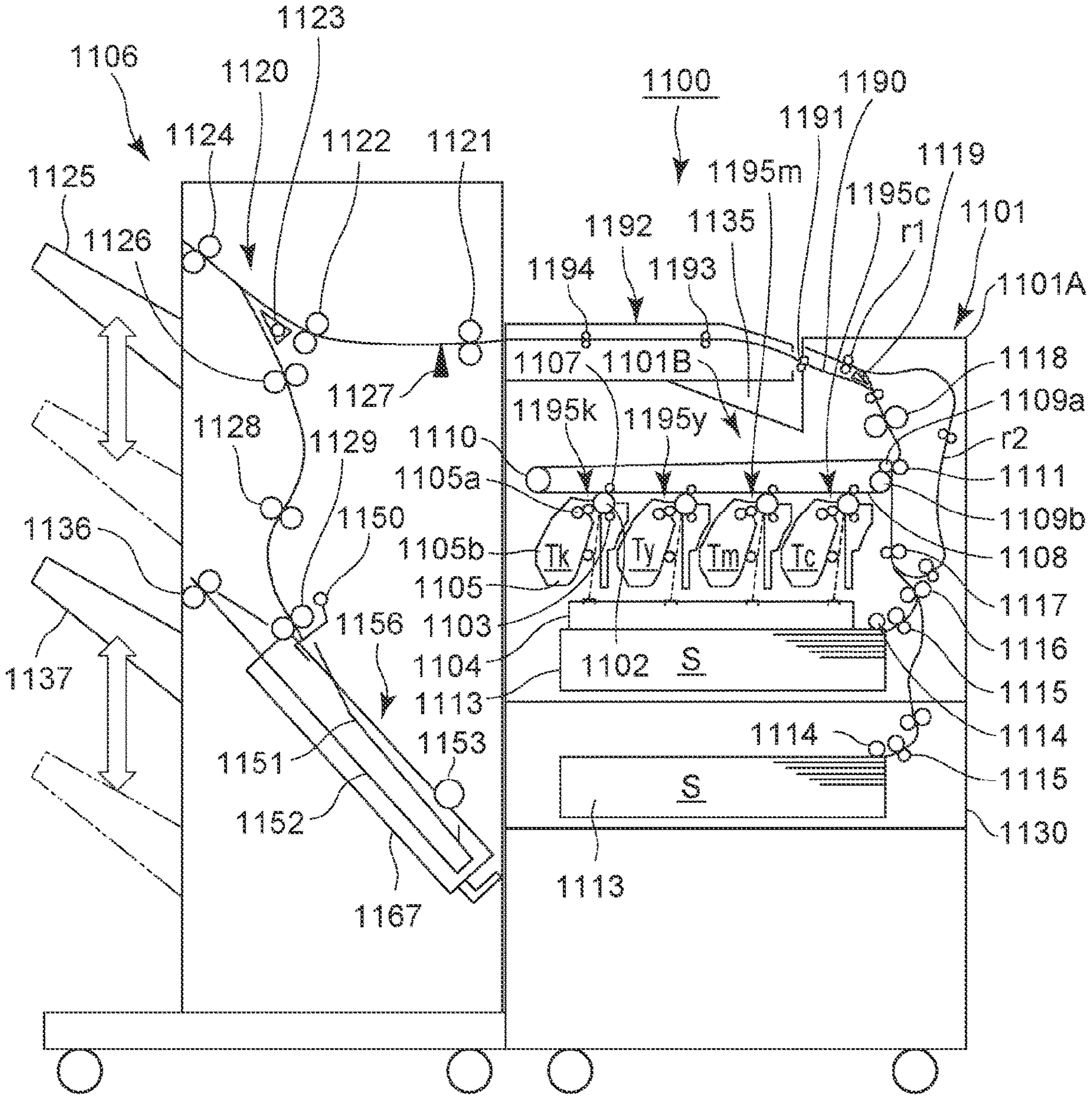
FIG. 3 is a schematic diagram of the image forming apparatus.

FIG. 3 is a schematic diagram of the image forming apparatus 1100 according to the first embodiment.

The image forming apparatus 1100 includes a printer main body 1101 as an image forming apparatus main body with an image forming function (printing function), and a sheet processing apparatus 1106 with a sheet adhering function. In other words, the image forming apparatus 1100 can be described as an image forming system consisting of the printer main body 1101, which functions as an image forming apparatus on its own, and the sheet processing apparatus 1106.

The image forming apparatus 1100 in the present embodiment forms an image on each sheet S using the printer main body 1101, and thermocompresses multiple sheets S using the sheet processing apparatus 1106, thereby creating a booklet that has been printed and bound in a single apparatus. Note that a diverse range of sheet materials in different sizes and materials can be utilized as the sheets S, including plain paper or cardstock, sheets with surface treatments like coated paper, plastic films, fabric, sheet materials with specialized shapes such as envelopes or index cards, etc.

Image Forming Apparatus Main Body

The printer main body 1101 is an electrophotographic apparatus equipped with a housing 1101A and an electrophotographic image forming unit 1101B housed within the housing 1101A.

The image forming unit 1101B includes an intermediate transfer belt 1108 as an intermediate transfer body, process cartridges arranged along the intermediate transfer belt 1108, a scanner unit 1104 as an exposure unit, and primary transfer rollers 1107. The process cartridges are available in four colors: yellow 1195*y*, magenta 1195*m*, cyan 1195*c*, and black 1195*k*.

The process cartridge 1195*k* uses black toner Tk to create a single-color image corresponding to the black component of a color image. The process cartridge 1195*y* uses yellow toner Ty to create a single-color image corresponding to the yellow component of a color image. The process cartridge 1195*m* uses magenta toner Tm to create a single-color image corresponding to the magenta component of a color image. The process cartridge 1195*c* uses cyan toner Tc to create a single-color image corresponding to the cyan component of a color image.

The process cartridge 1195*k* includes a photosensitive drum 1102 as an image carrier, a charging device 1103 as a charging unit, and a developing unit 1105 as a developing unit. Although only the process cartridge 1195*k* is illustrated in FIG. 3, the process cartridge 1195*y*, the process cartridge 1195*m*, and the process cartridge 1195*c* have the same structure.

Single-color images created respectively at the process cartridges 1195*y*, 1195*m*, 1195*c*, and 1195*k* are primary-transferred so as to overlap each other on the intermediate transfer belt 1108, and then secondary-transferred to a sheet at a secondary transfer unit.

The developing unit 1105 includes a developing roller 1105*a* as a developing unit, and a toner container 1105*b* containing toner (developer). The developing roller 1105*a* is rotatably held by the toner container 1105*b*. Although only the developing unit 1105 in the process cartridge 1195*k* is illustrated in FIG. 3, the process cartridge 1195*y*, the process cartridge 1195*m*, and the process cartridge 1195*c* have the same structure. The process cartridges 1195*y*, 1195*m*, 1195*c*, and 1195*k* are attachable/detachable to/from the housing 1101A. The "housing 1101A" of the printer main body 1101 refers to the portion excluding the process cartridges 1195 from the printer main body 1101. The housing 1101A includes a frame member such as a metal frame forming a frame body of the printer main body 1101, and a member fixed to the frame body, forming an attachment space where the process cartridges 1195 are attached.

The printer main body 1101 may use at least one of the multi-colored toners as toner for adhering sheets together. For example, the black toner Tk can be used both as toner for recording images on sheets and as adhesive toner. In this case, the process cartridge 1195*k* creates a single-color image corresponding to the black component of a color image and an adhesive toner image 39 (FIG. 6) to be transferred to the adhesive area of the sheet.

Within the housing 1101A, the scanner unit 1104 as an exposure unit is disposed below the process cartridges. Below the scanner unit 1104, a cassette 1113 (also referred to as a sheet tray or a storage compartment), which serves as a storage compartment for storing the sheets S used for image formation, is retractably attached to the housing 1101A. Additionally, one or more optional sheet feeding devices 1130, each including the additional cassette 1113, may be coupled below the housing 1101A.

The intermediate transfer belt 1108 is a movable (rotatable) endless belt tensioned on a drive roller 1109*a*, a stretching roller 1109*b*, and a tension roller 1110, which rotate around axes that are parallel to one another. The intermediate transfer belt 1108 is moved (rotated or conveyed) counter-clockwise in FIG. 3 due to the rotation of the drive roller 1109*a*. On the internal circumferential side of the intermediate transfer belt 1108, each primary transfer roller 1107 as a primary transfer member is disposed at a position opposite the photosensitive drum 1102 with the intermediate transfer belt 1108 interposed therebetween. On the outer circumferential side of the intermediate transfer belt 1108, a secondary transfer roller 1111 as a transfer member (secondary transfer member) is disposed at a position opposite the drive roller 1109*a* with the intermediate transfer belt 1108 interposed therebetween. The secondary transfer unit, which serves as a transfer unit, is formed as a nip portion between the intermediate transfer belt 1108 and the secondary transfer roller 1111. The intermediate transfer belt 1108, each primary transfer roller 1107, and the secondary transfer roller 1111 constitute a transfer unit for transferring a toner image formed on each photosensitive drum 1102, which serve as an image carrier, to the sheet S.

Above the secondary transfer unit in the housing 1101A, a fixing device 1118 as a fixing unit is disposed. The fixing device 1118 has a configuration of a thermal fixing method for fixing a toner image by heating. The fixing device 1118 has a pair of rotors (e.g., a pair of rollers consisting of a fixing roller and a pressurization roller) that clamps and conveys the sheet S, and a heat source (e.g., a halogen lamp or an induction heating mechanism) that heats the toner image on the sheet S via the fixing roller.

Image Forming Operation

When the printer main body 1101 executes image forming operations, the sheets S are fed from the cassette 1113 at the bottom of the housing 1101A or from the cassette 1113 of the sheet feeding device 1130 by a feeding roller 1114 as a feeding unit. A separation roller pair 1115 conveys the fed sheets S separately one by one. This sheet S is conveyed by an extraction roller 1116 toward a registration roller pair 1117, and the skew of the sheet S is corrected when the leading edge of the sheet S strikes the nip portion of the registration roller pair 1117 which is in the stopped state. The registration roller pair 1117 sends the sheet S to the secondary transfer unit at a timing synchronized with the progress of a toner image creation process by the image forming unit 1101B.

In contrast, in the image forming unit 1101B, each photosensitive drum 1102 and the intermediate transfer belt 1108 rotate. Each charging device 1103 uniformly charges the surface of the corresponding photosensitive drum 1102. The scanner unit 1104 irradiates the photosensitive drum 1102 with laser light to write an electrostatic latent image based on image information representing an image to be recorded on the sheet S. This electrostatic latent image is developed (visualized) as a toner image by the developing unit 1105 using toner.

Here, when performing later-described thermocompression using the sheet processing apparatus 1106, the scanner unit 1104 irradiates each photosensitive drum 1102 with laser light to write an electrostatic latent image based on information indicating the adhesive position of the sheet S. This electrostatic latent image is developed by the developing unit 1105 using toner, thereby forming an adhesive toner image in an area on the photosensitive drum 1102 corresponding to the adhesive position on the sheet S.

The single-color images created on the photosensitive drums 1102 respectively within the process cartridges 1195*y*, 1195*m*, 1195*c*, and 1195*k* are primary-transferred to overlap each other on the intermediate transfer belt 1108. The toner image is then conveyed toward the secondary transfer unit by the rotation of the intermediate transfer belt 1108. Then, application of voltage to the secondary transfer roller 1111 in the secondary transfer unit causes the toner image to be transferred (secondary transfer) to the sheet S which is fed from the registration roller pair 1117. The sheet S having passed through the secondary transfer unit is fed to the fixing device 1118, and the toner image is heated and pressurized while passing through the nip portion between the fixing roller and the pressurization roller to soften the toner, and then the toner solidifies, thereby fixing the image on the sheet S.

The sheet S having passed through the fixing device 1118 has its conveyance path switched by a switching unit 1119. In the case of single-sided printing, the sheet S is guided to a discharge path 1190 by the switching unit 1119 and is discharged from the housing 1101A by a discharge roller pair 1191. In the present embodiment, the printer main body 1101 is coupled with the sheet processing apparatus 1106 via a relay conveyance unit 1192. The sheet S discharged from the discharge roller pair 1191 is passed to the sheet processing apparatus 1106 via conveyance roller pairs 1193 and 1194 of the relay conveyance unit 1192. If the relay conveyance unit 1192 and the sheet processing apparatus 1106 are not coupled, the discharge roller pair 1191 discharges the sheet S as a finished product into a loading tray 1135 provided at the top of the housing 1101A.

In the case of double-sided printing, the sheet S with an image formed on its first side is guided to an inversion roller pair r1 by the switching unit 1119. Then, the sheet S is inverted and conveyed (switchback conveyance) by the inversion roller pair r1, and then is conveyed toward the registration roller pair 1117 via a double-sided conveyance path r2. After the sheet S undergoes image formation on its second side opposite the first side by passing through the secondary transfer unit and the fixing device 1118, the sheet S is discharged from the housing 1101A by the discharge roller pair 1191.

Figure 6:
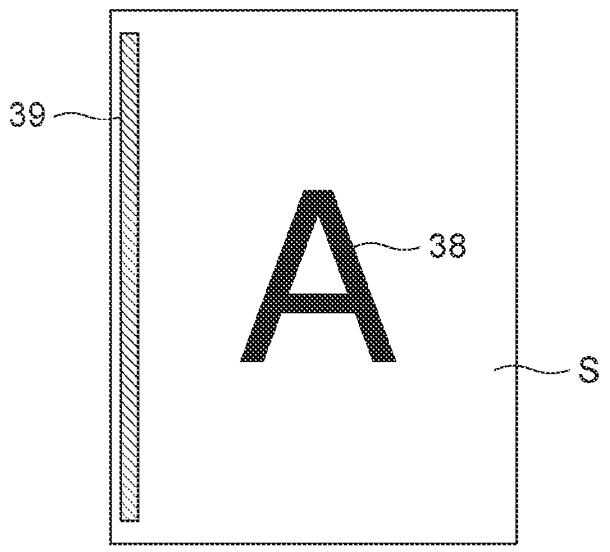
FIG. 6 is a diagram illustrating a toner image formed on a sheet by the image forming apparatus.

FIG. 6 is a diagram illustrating an example of a toner image formed on the sheet S. In the illustrated sheet S, a toner image (toner image for recording) 38 for recording an image, such as text, a figure, or a photo, and the toner image 39 for adhering the sheets together (adhesive toner image or toner image for pressure-bonding) are formed.

The position, shape, width, etc. of the adhesive toner image 39 can be changed according to the configuration of a thermocompression unit 1167 described later.

Note that, when the image forming apparatus 1100 creates a one-sided printed booklet, the adhesive toner image 39 is formed on only one side of the sheets S (the same side as the toner image for recording). In the case of a double-sided printed booklet, the adhesive toner image 39 may be formed on only one side of the sheets S, or may be formed on both sides of the sheets S.

Sheet Processing Apparatus

The sheet processing apparatus 1106 has a buffer unit 1120 as a buffer unit for stacking multiple sheets S, an alignment unit 1156 as an alignment unit for aligning the multiple sheets S, and the thermocompression unit 1167 for thermocompressing the sheets S together. The thermocompression unit 1167 is an example of a sheet adhesion device (adhesion unit, thermocompression unit, or lamination processing unit) that adheres sheets together. The sheet processing apparatus 1106 also includes a discharge upper tray 1125 and a discharge lower tray 1137, both of which are movable upward and downward, as discharge destinations to which the finished products of the image forming apparatus 1100 are discharged.

The sheet processing apparatus 1106 is a sheet processing apparatus that receives multiple sheets S on which images are formed, one sheet at a time, using the printer main body 1101, applies an adhesive treatment (thermocompression), and discharges them as a sheet bundle (booklet). The buffer unit 1120, the alignment unit 1156, and the thermocompression unit 1167 will be described in detail later. The sheet processing apparatus 1106 can alternatively discharge the sheets S on which images have been formed by the printer main body 1101 to the discharge upper tray 1125 or the discharge lower tray 1137 without applying a treatment to the sheets S.

Buffer Unit

Figure 4:
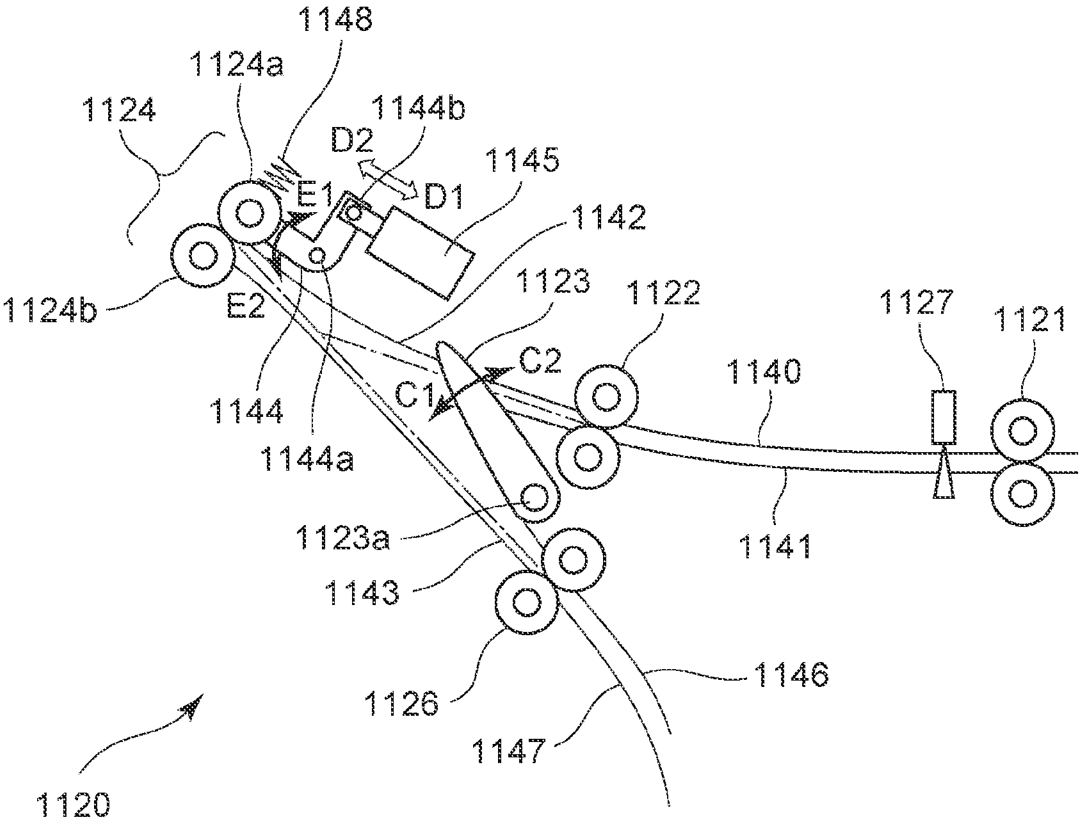
FIG. 4 is a diagram illustrating a buffer unit of a sheet processing apparatus.

The buffer unit 1120 will be described using FIG. 3. FIG. 4 is an enlarged view of a cross-section of the buffer unit 1120. The buffer unit 1120 includes an inlet roller pair 1121, a pre-buffer roller pair 1122, a backflow prevention valve 1123, an inversion roller pair 1124, and an internal discharge roller pair 1126. The buffer unit 1120 also includes elements such as an inlet sensor 1127 that senses a sheet, and a separation mechanism consisting of a plunger solenoid 1145, for opening and closing (bringing into contact and separating) the inversion roller pair 1124.

The inlet roller pair 1121, the pre-buffer roller pair 1122, the inversion roller pair 1124, and the internal discharge roller pair 1126 are roller pairs that clamp and convey sheets. The inlet roller pair 1121 and the pre-buffer roller pair 1122 are disposed in a conveyance path (inlet path) for the sheet processing apparatus 1106 to receive the sheets S. The inversion roller pair 1124 is disposed in a conveyance path (first discharge path, see FIG. 3) that communicates with the discharge upper tray 1125. The internal discharge roller pair 1126 is disposed in a conveyance path (internal discharge path, see FIG. 3) from the inversion roller pair 1124 toward the thermocompression unit 1167. Note that the sheet processing apparatus 1106 includes a conveyance path (second discharge path, see FIG. 3) from the thermocompression unit 1167 toward the discharge lower tray 1137.

The inlet path is formed of an inlet upper guide 1140 and an inlet lower guide 1141. The first discharge path is formed of an inversion upper guide 1142 and an inversion lower guide 1143. The internal discharge path is formed of an internal discharge upper guide 1146 and an internal discharge lower guide 1147.

The inlet sensor 1127 is disposed to detect a sheet received by the inlet roller pair 1121. The inlet sensor 1127 can use a reflective photo sensor, for example, which irradiates the inlet path with infrared light through an opening provided in the inlet upper guide 1140 and detects reflected light from the sheet to determine the presence or absence of the sheet S. The inlet lower guide 1141 may be provided with a hole greater than or equal to the spot diameter of the infrared light emitted by the inlet sensor 1127 so as not to reflect infrared light when the sheet is not passing through the inlet path.

The backflow prevention valve 1123 is disposed downstream of the pre-buffer roller pair 1122 with respect to the sheet conveying direction of the inlet path. The backflow prevention valve 1123 is rotatably disposed around a rotation shaft 1123*a* with respect to the internal discharge upper guide 1146. The backflow prevention valve 1123 is movable to a first position for preventing movement (backflow) of the sheet from the first discharge path to the inlet path and to a second position for allowing movement of the sheet from the inlet path to the first discharge path. The backflow prevention valve 1123 is biased by a spring, which is not illustrated, in C2 direction from the second position toward the first position. When pressed against the sheet, the backflow prevention valve 1123 is configured to move in C1 direction from the first position toward the second position, and to return to the first position when the sheet passes through.

When viewed in the rotational axial direction of the backflow prevention valve 1123, the tip of the backflow prevention valve 1123 which is at the first position overlaps with the inversion upper guide 1142. Moreover, the tip of the backflow prevention valve 1123 is formed in a comb-toothed shape to allow overlapping with the inversion upper guide 1142. Also, when viewed in the rotational axial direction of the backflow prevention valve 1123, a space is formed, through which the sheet can pass, between the backflow prevention valve 1123 which is at the second position and the inversion upper guide 1142.

The inversion roller pair 1124 is composed of an inversion upper roller 1124*a* and an inversion lower roller 1124*b*, both of which are provided with drive. The inversion upper roller 1124*a* and the inversion lower roller 1124*b* are configured to rotate in a synchronized manner at all times. Also, a separation lever 1144 is connected to the inversion upper roller 1124*a*. The separation lever 1144 is pivotally supported around a lever pivot shaft 1144*a* relative to the inversion upper guide 1142. Moreover, the separation lever 1144 is connected to the plunger solenoid 1145 in a rotatable manner at a solenoid connection shaft 1144*b*.

As current flows through the plunger solenoid 1145, the core moves in D1 direction in FIG. 4, so that the separation lever 1144 rotates in E1 direction in FIG. 4. In this case, the inversion roller pair 1124 is in a separated state (a state in which the nip portion is open) in which the inversion upper roller 1124*a* and the inversion lower roller 1124*b* are separated apart. Also, if the current flowing through the plunger solenoid 1145 is stopped, the biasing force of a pressurization spring 1148 causes the inversion upper roller 1124*a* to move in E2 direction, and the core of the plunger solenoid 1145 moves in D2 direction. In this case, the inversion roller pair 1124 is in a contact state (a state in which the nip portion is formed) in which the inversion upper roller 1124*a* and the inversion lower roller 1124*b* are in contact with each other.

The buffer unit 1120, as described below, performs an operation where it reciprocates the sheets (bundle) between the inversion roller pair 1124 and the internal discharge roller pair 1126, while stacking newly conveyed sheets on top of the sheets (bundle). Through this operation, the buffer unit 1120 is able to send the sheets to the alignment unit 1156 in stacked sets of a predetermined number of sheets (for example, five sheets).

The sheet bundle stacked in the buffer unit 1120 is conveyed from the internal discharge roller pair 1126 to an intermediate conveyance roller pair 1128, and then to a kick-out roller pair 1129, as illustrated in FIG. 3. The sheet bundle is then conveyed by the kick-out roller pair 1129 to the alignment unit 1156 (intermediate stacking unit or processing stage), which consists of elements such as an intermediate upper guide 1151 and an intermediate lower guide 1152. Moreover, a bundle holding flag 1150, which is configured to suppress the lifting of the trailing edge of the stacked sheets, is disposed downstream of the kick-out roller pair 1129, so as to prevent interference between the trailing edge of the sheets already stacked in the alignment unit 1156 and the leading edge of the subsequent sheets being conveyed to the alignment unit 1156.

Operation of Thermocompression Unit

Thermocompression operations of the thermocompression unit 1167 will be described using FIGS. 5A to 5F. FIGS. 5A to 5F each illustrate a view of the thermocompression unit 1167 from the side, depicting the sheet conveying direction.

Figures 5A, 5B, 5C, 5D, 5E, 5F:
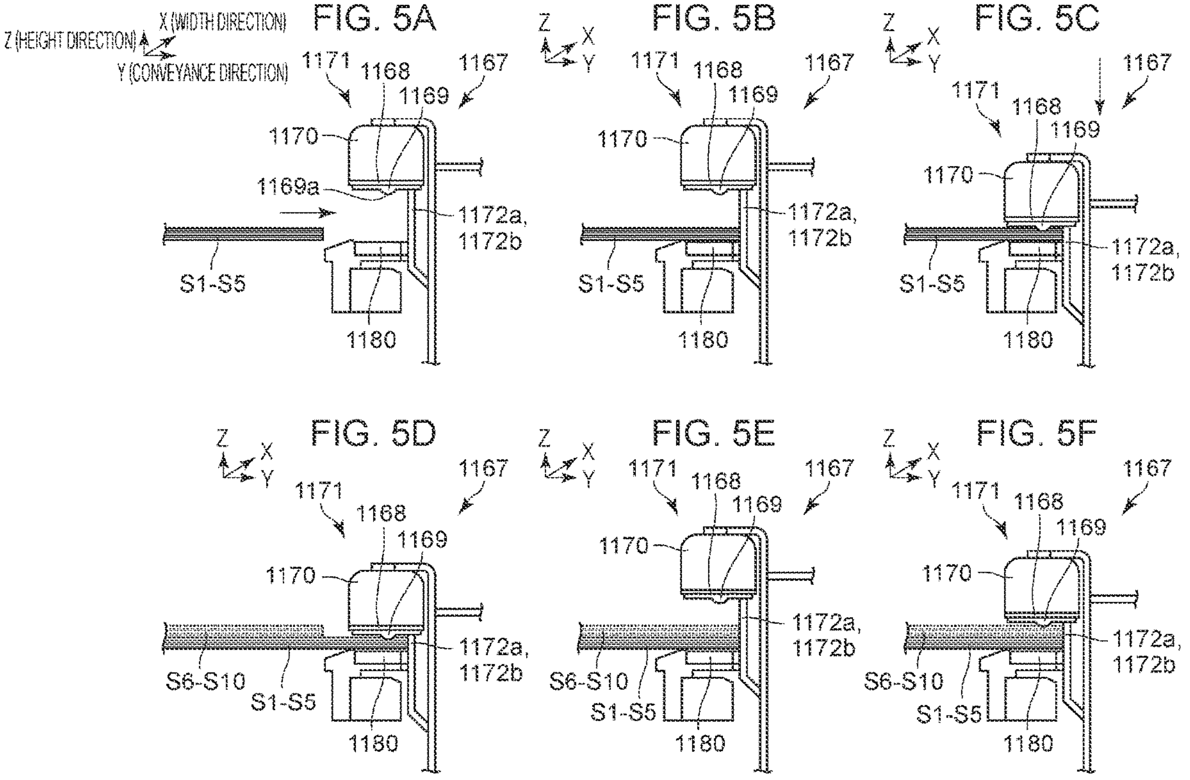
FIGS. 5A to 5F are diagrams each illustrating the operation of a thermocompression unit.

FIG. 5A illustrates the state in which the alignment of sheets S1 to S5 in the sheet conveying direction (Y direction) is completed. In this state, a heater unit 1171 is at a position separated from the sheet bundle in the Z direction.

FIG. 5B illustrates the state in which the alignment of the sheets S1 to S5 in the width direction is completed. The sheets S1 to S5 are aligned in the sheet width direction (X direction) by being pushed against width alignment reference plates 1172*a* and 1172*b*.

FIG. 5C illustrates the state in which the positive rotation of a motor causes the heater unit 1171 to move in the direction of pressurization (−Z side), and a contact surface 1169*a* of a pressurization plate 1169 abuts the uppermost sheet S5.

FIG. 5D illustrates the state in which, as the driving of the motor continues, the sheets S1 to S5 are clamped between the pressurization plate 1169 and a receiving plate 1180, where the thermocompression of the sheets S1 to S5 is in progress. FIG. 5D also illustrates that the subsequent sheets S6 to S10 are conveyed to the alignment unit 1156 in parallel with the thermocompression of the sheets S1 to S5.

FIG. 5E illustrates the state in which, after the thermocompression of the sheets S1 to S5 is completed, the reverse rotation of the motor 1177 causes the heater unit 1171 to move (retreat) to the opposite side (+Z side) of the pressurization direction, making the pressurization plate 1169 separated from the sheet S5. FIG. 5E also illustrates that, after the alignment of the subsequent sheets S6 to S10 has been performed and the heater unit 1171 has retracted, the sheets S1 to S5 are pushed against the width alignment reference plates 1172*a* and 1172*b*.

FIG. 5F illustrates the state in which the positive rotation of the motor causes the heater unit 1171 to move again in the direction of pressurization (−Z side), and the sheets S1 to S10 are clamped between the pressurization plate 1169 and the receiving plate 1180, where the thermocompression of the sheets S6 to S10 is in progress. Here, an adhesive toner image is formed on the top surface of the sheet S5 and/or the bottom surface of the sheet S6, and this causes a sheet bundle consisting of the sheets S1 to S5 and a sheet bundle consisting of the sheets S6 to S10 to be thermocompressed together.

In this way, the thermocompression unit 1167 performs a single thermocompression operation each time a bundle of a predetermined number of sheets is aligned by the alignment unit 1156, and, by repeating this operation multiple times, it is possible to create a booklet composed of a greater number of sheets than the predetermined number of sheets. Although an example of a booklet consisting of ten sheets S1 to S10 has been described here, a booklet consisting of dozens or more sheets can also be created.

When the thermocompression of all sheets that make up a part of the booklet is completed, the booklet composed of the sheets S1 to S10 is pushed out by a vertical alignment reference plate and is conveyed in the direction (−Y side) towards a bundle discharge roller pair 1136 (see FIG. 3) with respect to the sheet conveying direction. In other words, the vertical alignment reference plate is an example of an extrusion member extruding a sheet bundle from the alignment unit 1156 and the thermocompression unit 1167. Note that, in addition to the vertical alignment reference plate as a reference for aligning a sheet bundle, an extrusion member that extrudes the processed sheet bundle may be provided.

The bundle discharge roller pair 1136 is a pair of rollers that can open and close (that can come into contact and separated), and receive the booklet in a separated state. After the leading edge of the booklet in the direction in which the vertical alignment reference plate extrudes the booklet passes the position of the bundle discharge roller pair 1136, the movement of the vertical alignment reference plate is stopped, and the bundle discharge roller pair 1136 switches to a contact state. This causes the bundle discharge roller pair 1136 to clamp and convey the booklet and discharge it into the discharge lower tray 1137. In the meantime, the vertical alignment reference plate passes the booklet to the bundle discharge roller pair 1136, and then returns to a standby position again.

In this way, with the configuration of the present embodiment as well, a sheet adhesion apparatus that can more stably adhere sheets together, a sheet processing apparatus, and an image forming apparatus can be provided.

Printer Driver

The printer driver will now be described using FIGS. 7A and 7B.

The printer driver is a printing control program installed on the PC 100 and executed by the CPU 21. When the printer driver is called from a document program similarly installed on the PC 100, the printer driver generates printing information consisting of a print settings command for performing printing and a rendering data command for printing. The printing information generated by the CPU 21 using the printer driver is transmitted similarly by the CPU 21 to the image forming apparatus 1100, which is connected via the communication line 150, using the operating system (OS), where print processing and sheet processing are implemented.

Figure 7A:
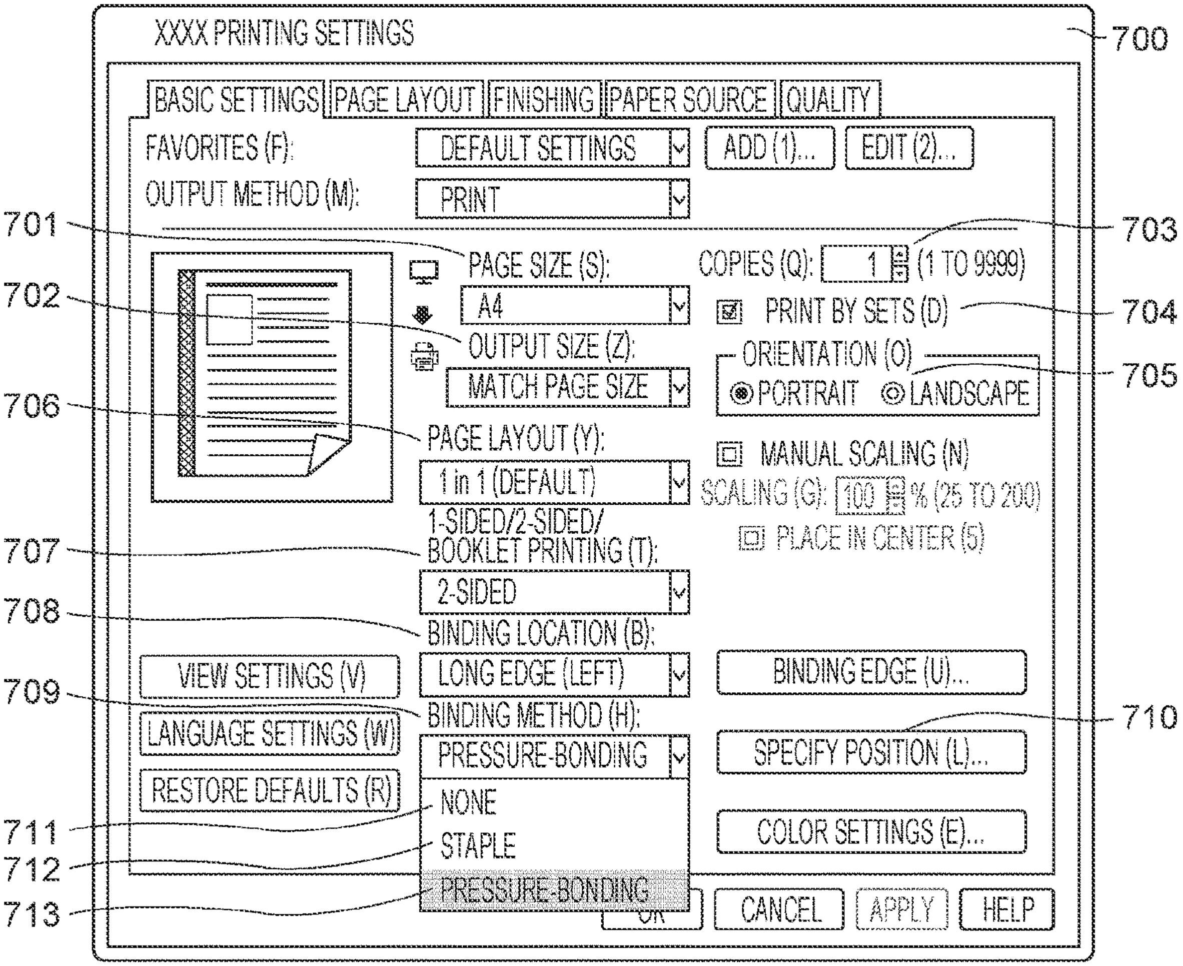
FIGS. 7A and 7B are diagrams each illustrating a screen of a printer driver.

FIG. 7A illustrates an example of a print settings screen of the printer driver installed on the PC 100. A print settings screen 700 is displayed on a display device such as the display 25 based on the instructions of the CPU 21, and the user configures print settings using an input device such as the mouse 27 and/or the keyboard 26 through this screen.

The print settings screen 700 provides basic print settings such as document size 701, paper size 702, number of copies 703, print by sets 704, and print orientation 705. It is also possible to set, as extended print functions, page layout 706 for setting allocation printing, single-sided/double-sided/bookbinding 707 for choosing between single-sided, double-sided, or bookbinding printing, and binding direction 708 for setting the binding direction of the printed material. Furthermore, the print settings screen 700 of the present embodiment has a control of a binding method 709, which sets the binding method for a printed material. The print settings screen 700 in FIG. 7A indicates the screen upon the setting of the binding method 709. In addition to options such as "None" 711 for no binding and "Staple" 712 for stapling, it is also possible to set "Pressure-bonding" 713 for performing thermocompression according to the present embodiment.

Figure 7B:
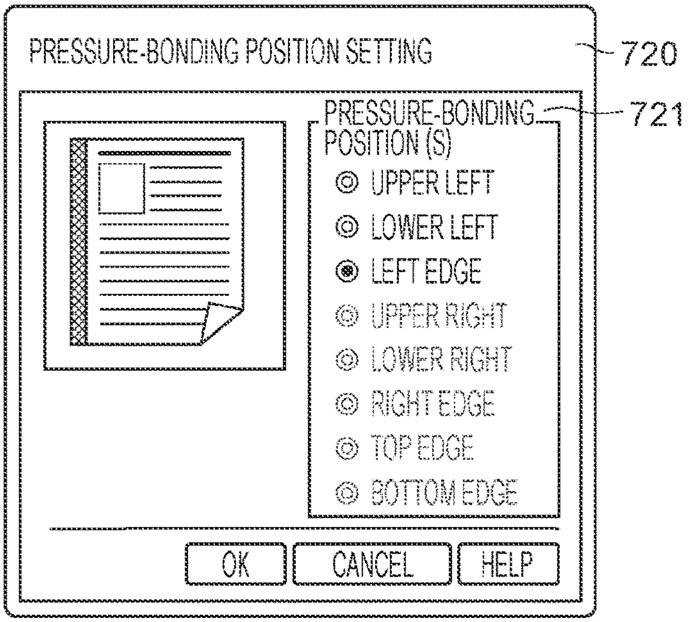

FIG. 7B illustrates a settings screen for specifying a position to apply the binding method set under the binding method 709, which is displayed on a display device such as the display 25 based on the instructions of the CPU 21 when a position specification 710 button in FIG. 7A is pressed. When pressure-bonding 713 is set as the binding method 709, a pressure-bonding position specification screen 720 as illustrated in FIG. 7B is displayed. In the pressure-bonding position specification screen 720, the user sets a pressure-bonding position 721. The radio buttons for pressure-bonding positions that can be set are displayed in an active state, while the radio buttons for pressure-bonding positions that cannot be set are displayed in an inactive state. The user can specify a desired pressure-bonding position by choosing from the radio buttons for pressure-bonding positions in an active state. In the example illustrated in FIG. 7B, three positions, i.e., the upper left, the lower left, and the left edge, are in an active state, meaning that they can be set, and it is indicated that the left edge has been set.

When pressure-bonding 713 is set as the binding method 709, the CPU 21 writes a command into the printing information using the printer driver to implement thermo-compression at the position set under the pressure-bonding position 721, and the image forming apparatus 1100, upon receiving this printing information, performs the pressure-bonding processing using its pressure-bonding unit 207.

Operation Unit

Figure 8A:
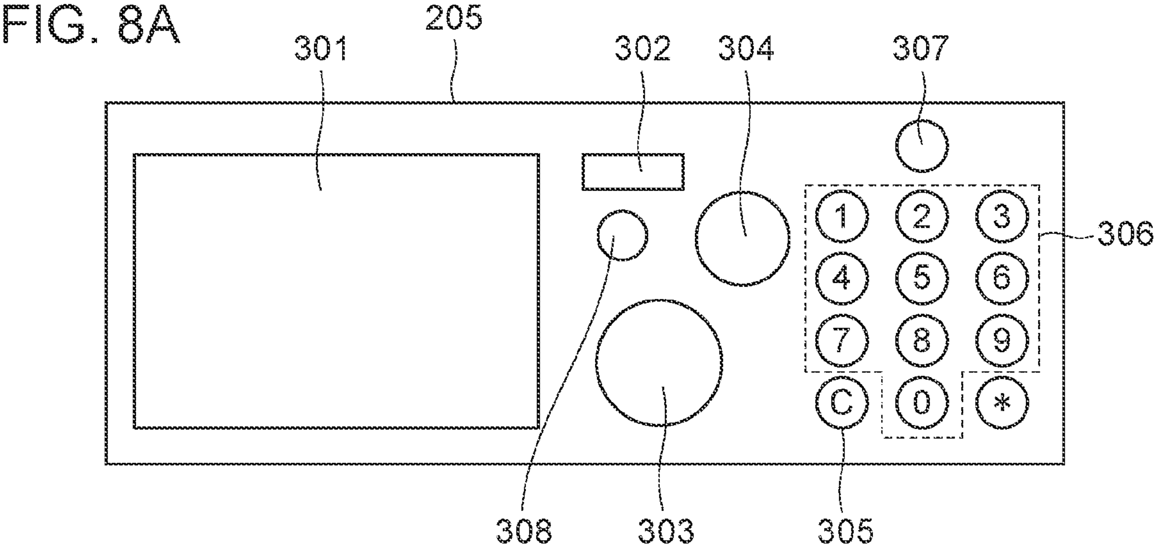
FIG. 8A is a diagram illustrating an operation unit.
Figure 8B:
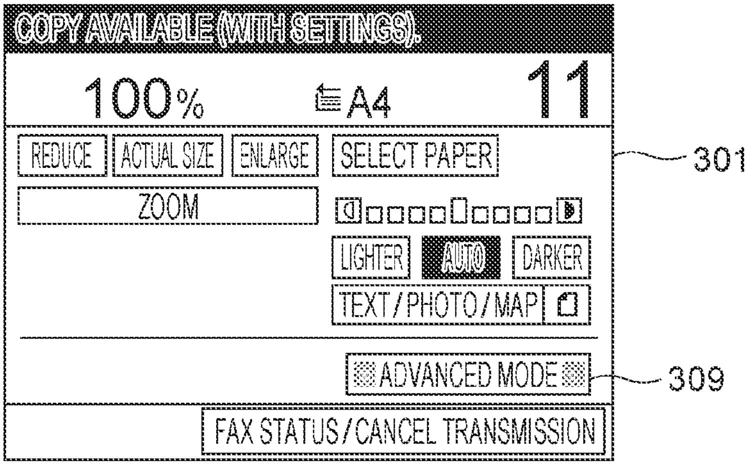
FIGS. 8B and 8C are diagrams each illustrating a screen.

In FIG. 8A, reference numeral 205 denotes the operation unit of the image forming apparatus 1100, which inputs and sets various conditions and information to the CPU 200 in the image forming apparatus 1100. FIG. 8A is a plan view of the operation unit 205 in the present embodiment. Reference numeral 301 denotes a touchscreen display, and, as in FIG. 8B, the number of copies, selected sheet size, scaling, and copy density are displayed. Pressing an advanced mode 309 of this screen causes a transition to a screen where various settings of a copy job can be configured. Reference numeral 302 denotes a reset key, which is used to reset the copy mode back to the default mode. Reference numeral 303 denotes a start key, which is used to start a copy operation. Reference numeral 304 denotes a stop key, which is used to interrupt a copy operation. Reference numeral 305 denotes a clear key, which is used to reset the copy mode back to the default mode. Reference numeral 306 denotes a numeric keypad, which is used to set the number of copies. Reference numeral 307 denotes a user mode key; by pressing this key, menu selection becomes possible, and various settings for the image forming apparatus 1100 can be registered.

Figure 8C:
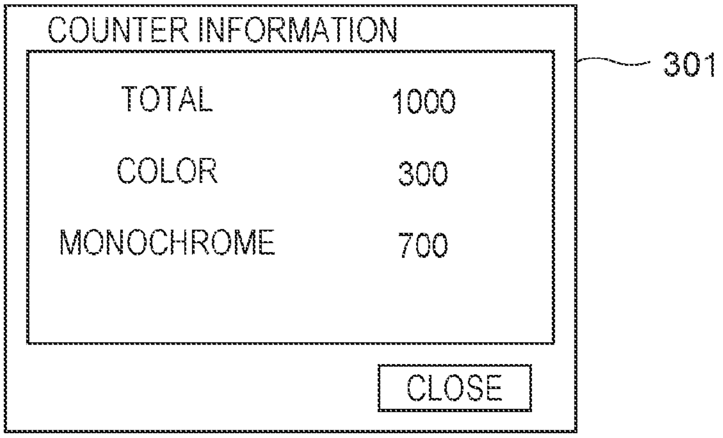

Reference numeral 308 denotes a counter key; by pressing this counter key, the touchscreen display 301 becomes a screen as illustrated in FIG. 8C, allowing the user to view various counter information.

The touchscreen display 301 is also used to notify the user of information such as sheet jam information and toner information.

Although a tandem-type color printer configuration including four process cartridges has been described in the present embodiment, the types of toner may be five or more, or three or less. Alternatively, instead of a configuration in which at least one of the multi-colored toners is used as both toner for recording images on sheets and adhesive toner, adhesive-only toner may be used. In this case, a process cartridge using adhesive-only toner only creates the adhesive toner image 39 (as illustrated in FIG. 6).

For the printer main body 1101 as described above, when the number of sheets exceeds the upper limit number of sheets, if the sheets are output without executing pressure-bonding as specified by the user, each sheet remains unbonded, resulting in an increased workload for pressure-bonding the output sheets in an unattached state. However, according to the present embodiment, when printing images on sheets exceeding a predetermined number of sheets, multiple sheet bundles where pressure-bonding has been performed are output. This reduces the subsequent workload for binding the multiple sheet bundles together to create a bound booklet.

Processing of Printer Main Body

Figure 9:
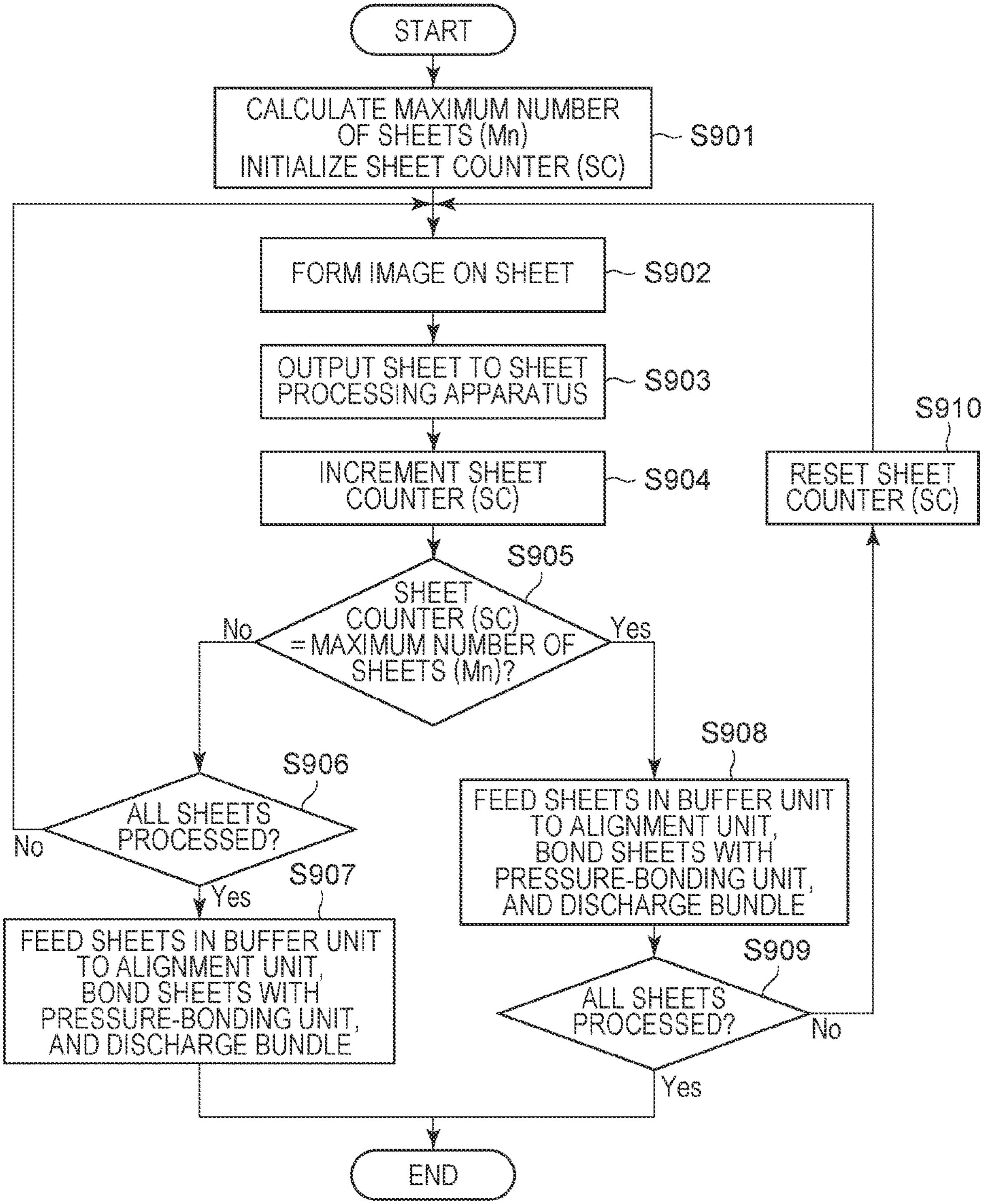
FIG. 9 is a flowchart illustrating the processing of a printer main body according to a first embodiment.

FIG. 9 is a flowchart illustrating the processing of the image forming apparatus 1100 according to the present embodiment. This flowchart will be used to describe the processing of the image forming apparatus 1100. Note that each step in FIG. 9 is realized by the CPU 200 reading out a program stored in the ROM 201 or the HDD 203 to the RAM 202 and executing it.

Printing information generated by the PC 100 is sent to the printer main body 1101 through the communication line 150 and the network IF 208. After the printing information is stored in the HDD 203 by the CPU 200, a printing operation is initiated by the CPU 200. The printing information includes image data generated by the PC 100, as well as print settings for printing based on the image data.

First, the CPU 200 determines the maximum number of sheets (Mn) constituting a single booklet (sheet bundle) based on information included in the printing information, such as the sheet type used for printing and the performance or capacity of the thermocompression unit 1167 of the attached sheet processing apparatus 1106. For example, if the sheets used for printing are plain paper, the CPU 200 determines the maximum number of sheets to be 100 sheets. In the meantime, if the sheets used for printing are cardstock, the CPU 200 determines the maximum number of sheets to be 80 sheets. These may be determined by storing the maximum number of sheets for each paper type in the HDD 203 and allowing the CPU 200 to refer to it. This maximum number of sheets is the upper limit value of the number of sheets that can be output in one batch after pressure-bonding the sheets together multiple times. Moreover, the CPU 200 stores a sheet counter (SC) in the RAM 202, and initializes the sheet counter (SC) to 0 (S901).

The CPU 200 then applies control to form images on sheets based on the print settings and image data included in the printing information (S902). Image formation performed here may be forming images on one side of sheets or on both sides of sheets, and the CPU 200 decides which image formation to perform according to the print settings.

After finishing the image forming processing of one sheet, the CPU 200 applies control to convey the sheet to the sheet processing apparatus 1106 (S903), and increments the sheet counter (SC) (S904).

The CPU 200 then compares the value of the sheet counter (SC) with the value of the maximum number of sheets (Mn) (S905).

If the sheet counter (SC) is less than the maximum number of sheets (Mn), the CPU 200 determines whether the image forming processing of all the image data included in the printing information has been completed (S906).

If there remains image data that has not yet undergone the image forming processing, the CPU 200 returns the processing to S902 and performs the image forming processing of the remaining sheet(s).

In contrast, if it is determined in S906 that the image forming processing of all sheets has been completed, the CPU 200 allows the processing to proceed to S907.

In S907, the CPU 200 applies control to feed the sheets in the buffer unit 1120 to the alignment unit 1156, and applies control to perform the thermocompression processing using the thermocompression unit 1167. The CPU 200 then applies control to discharge the created booklet into the discharge lower tray 1137, and ends the print processing.

If it is determined in S905 that the sheet counter (SC) is equal to the maximum number of sheets (Mn), the CPU 200 applies control to feed the sheets in the buffer unit 1120 to the alignment unit 1156. The CPU 200 then applies control to perform the thermocompression processing using the thermocompression unit 1167, and applies control to discharge the created booklet into the discharge lower tray 1137 (S908).

Thereafter, the CPU 200 determines whether the image forming processing of all the image data included in the printing information has been completed (S909). If it is determined that there remains any sheet(s) that have not yet undergone the image forming processing, the CPU 200 resets the sheet counter (SC) (S910), and then allows the processing to proceed to S902, where the CPU 200 applies control to perform the image forming processing of the remaining sheet(s).

If it is determined in S909 that the image forming processing of all sheets has been completed, the CPU 200 ends the print processing.

In this way, the sequential processing illustrated in FIG. 9 is performed, based on one set of printing information received from the PC 100, to generate one job and manage it.

In this manner, the CPU 200 applies control to perform the pressure-bonding of sheets multiple times so that the number of sheets included in each sheet bundle does not exceed a predetermined number of sheets, thereby creating a plurality of sheet bundles.

The predetermined number of sheets mentioned here is described as the upper limit value of the number of sheets that can be output in one batch. For example, in the case of plain paper, the predetermined number of sheets is 100 sheets. At this time, a sheet bundle may be output every 100 sheets, or a sheet bundle may be output every 95 sheets. The CPU 200 applies control to perform pressure-bonding of a predetermined number of sheets that is less than or equal to the predetermined number of sheets, and to perform pressure-bonding of a certain number of the subsequent sheets, less than or equal to the predetermined number of sheets, thereby generating multiple sheet bundles. Also, multiple sheet bundles may be output for every number of sheets set by the user on the PC 100.

Although it has been described that this predetermined number of sheets is determined according to the type of paper, a fixed value such as 50 sheets may be used regardless of the type of paper.

By performing the above processing, even in the case of printing a number of sheets exceeding the number of sheets that can be processed in one batch by the sheet processing apparatus 1106, the output in the form of several divided booklet bundles is possible.

The user can easily compile the divided booklets into a single finished product by using an offline process, such as adhering them together using some adhesive materials. Additionally, the user can create a bound booklet easily by punching holes in each booklet bundle and binding them together using a binder.

Second Embodiment

In the first embodiment described above, it has been described that, on the printer main body 1101 side, it is determined whether to perform booklet printing in several bundles, and booklet printing in several bundles is performed. Here, as a second embodiment, an embodiment is described where the determination of whether to perform booklet printing in several bundles is made using the printer driver on the PC 100 side. Furthermore, the process of setting whether or not to apply toner for thermocompression additionally between the bundles in the case of booklet printing in several bundles will be also described.

Extended Driver Settings

Figure 10A:
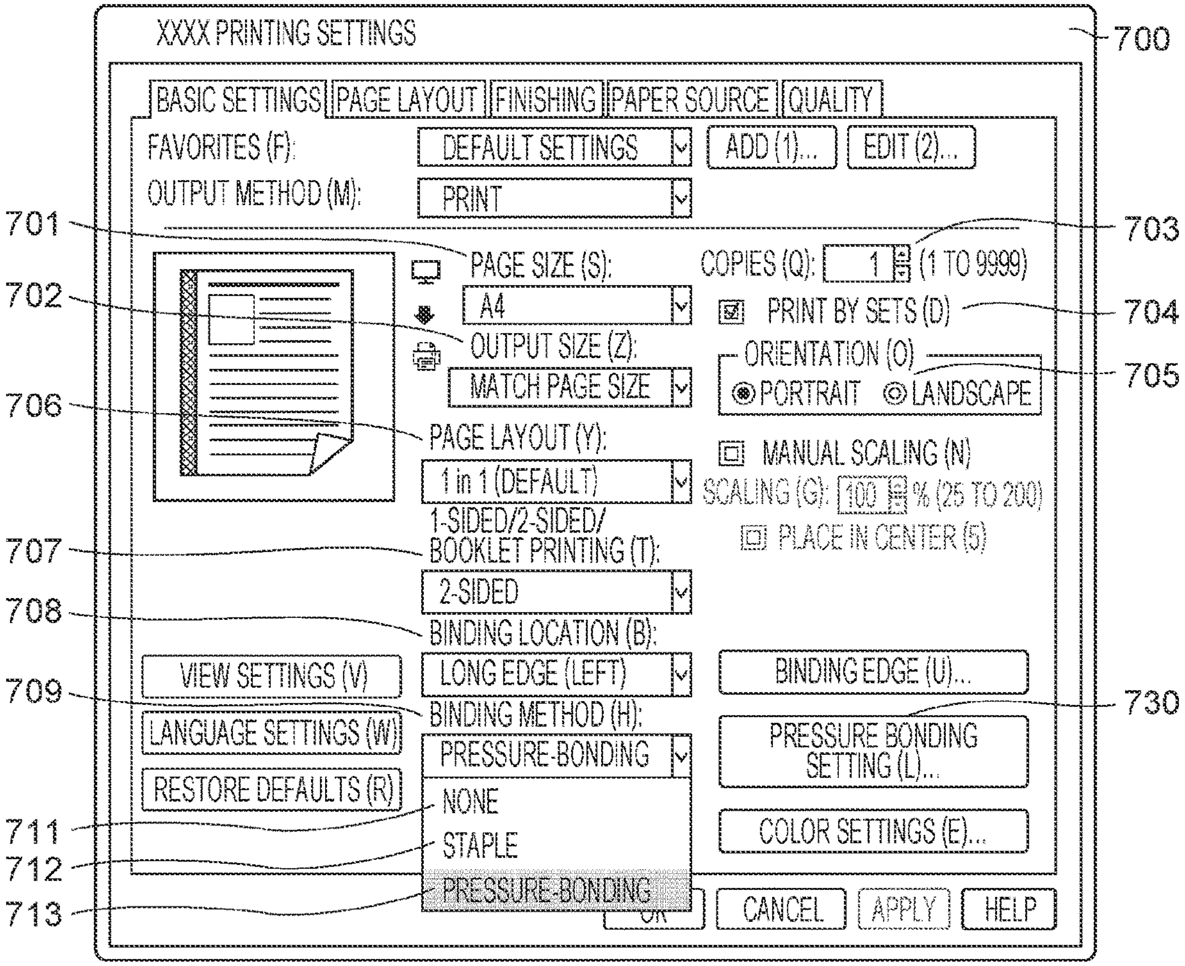
FIGS. 10A and 10B are diagrams each illustrating a screen of the printer driver according to a second embodiment.
Figure 10B:
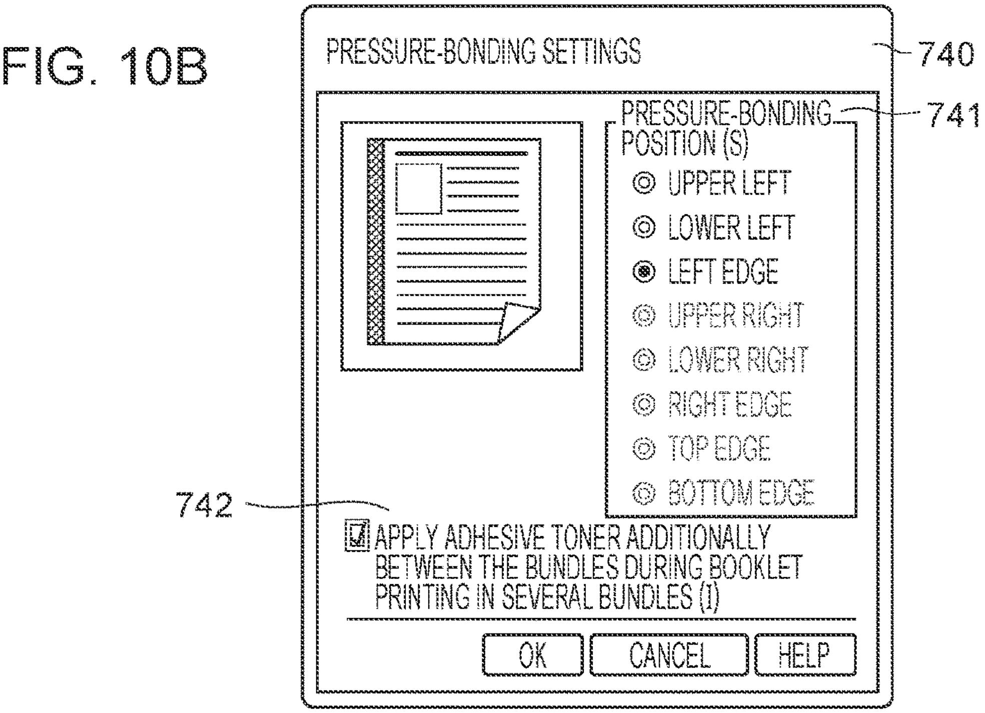

FIG. 10A is a diagram illustrating a screen of the printer driver of the present embodiment, and the position specification button 710 for the setting of the binding method 709 illustrated in FIG. 7A has been replaced by a pressure-bonding setting button 730. FIG. 10B illustrates an example of a pressure-bonding settings screen 740, which is displayed when the pressure-bonding setting button 730 is pressed. Note that the print settings screen 700 and the pressure-bonding settings screen 740 illustrated in FIGS. 10A and 10B are displayed on a display device such as the display 25 based on the instructions of the CPU 21, and the user configures print settings using an input device such as the mouse 27 and/or the keyboard 26 through this screen.

In the pressure-bonding settings screen 740, the setting "Apply adhesive toner additionally between the bundles during booklet printing in several bundles" (742) has been added to the pressure-bonding position specification screen 720 discussed in the previous embodiment.

The process of applying adhesive toner additionally between the bundles during booklet printing in several bundles will be described later.

Figure 11:
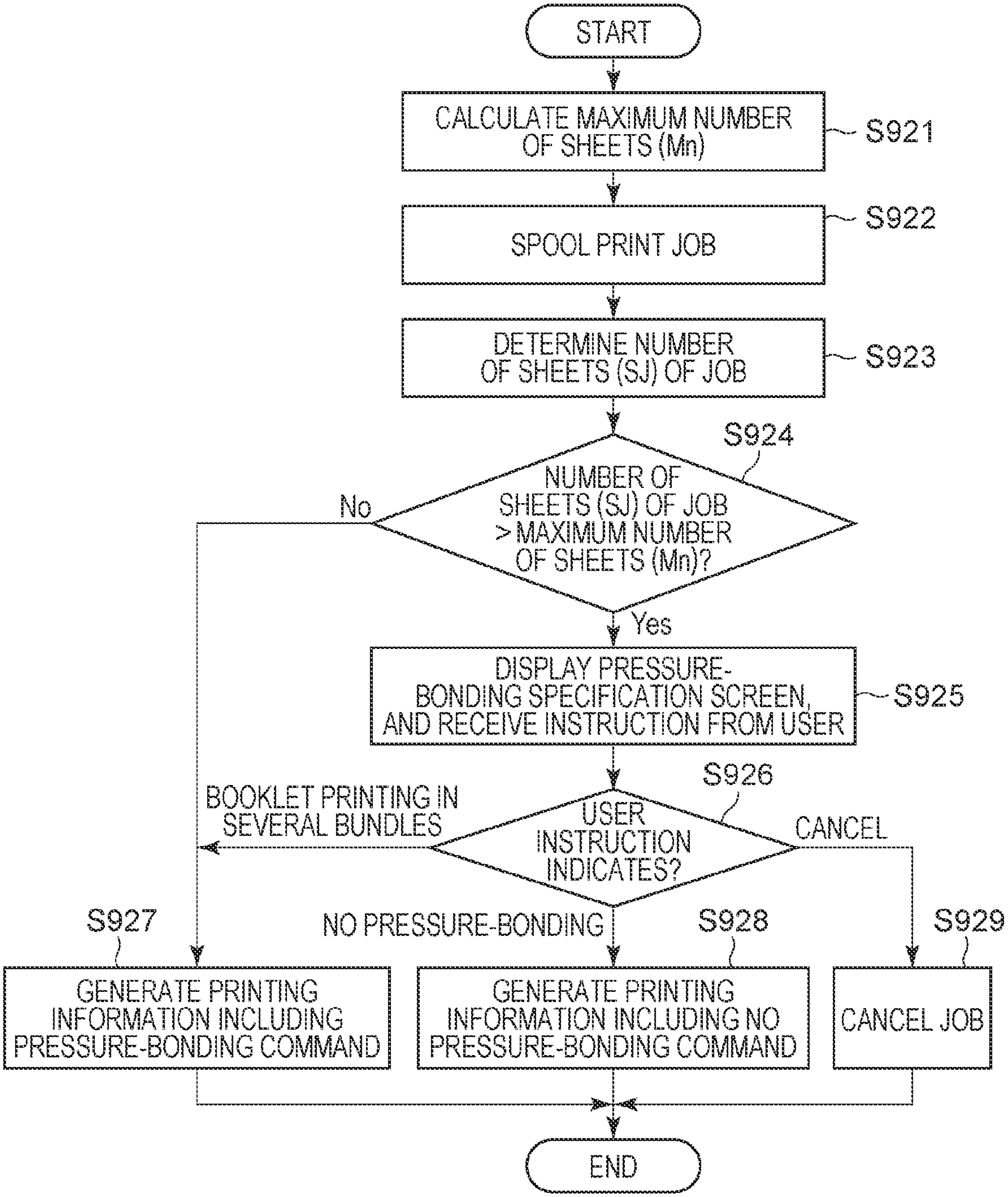
FIG. 11 is a flowchart illustrating a printing information generation process of the PC according to the second embodiment.

FIG. 11 is a flowchart illustrating the printing information generation processing of the PC 100 in the present embodiment. This flowchart will be used to describe the printing information generation processing of the PC 100 in the present embodiment. Note that each step in FIG. 11 is realized by the CPU 21 reading out a program stored in the ROM 23 or the HDD 28 to the RAM 22 and executing it.

On the PC 100, in order to perform printing, the CPU 21 executes a document program and a printer driver stored in the HDD 28 to create a print job consisting of print settings and image data.

First, the CPU 21 determines the maximum number of sheets (Mn) constituting a single booklet based on information on settings configured under the print settings, such as the sheet type used for printing and the performance or capacity of the thermocompression unit 1167 of the sheet processing apparatus 1106 (S921). For example, if the sheets used for printing are plain paper, the CPU 21 determines the maximum number of sheets to be 100 sheets. In the meantime, if the sheets used for printing are cardstock, the CPU 200 determines the maximum number of sheets to be 80 sheets. These may be determined by storing the maximum number of sheets for each paper type in the HDD 203 and allowing the CPU 200 to refer to it. This maximum number of sheets is the upper limit value of the number of sheets that can be output in one batch after pressure-bonding the sheets together multiple times.

Thereafter, based on the print settings and image data, the CPU 21 counts the number of pages printed in the print job and temporarily stores it in the HDD 28 (S922) to determine the number of sheets (SJ) of the print job (S923).

The CPU 21 then compares the value of the maximum number of sheets (Mn) with the value of the number of sheets (SJ) of the print job (S924). If the number of sheets (SJ) of the print job is less than or equal to the maximum number of sheets (Mn), the CPU 21 generates printing information including a pressure-bonding command according to the print settings (S927). The generated printing information is sent to the printer main body 1101, which in turn implements the processing previously described using FIG. 9 in the first embodiment. Since the sheet counter (SC) never exceeds the maximum number of sheets (Mn), a single bundle of sheets that have been pressure-bonded together is generated.

Figure 12:
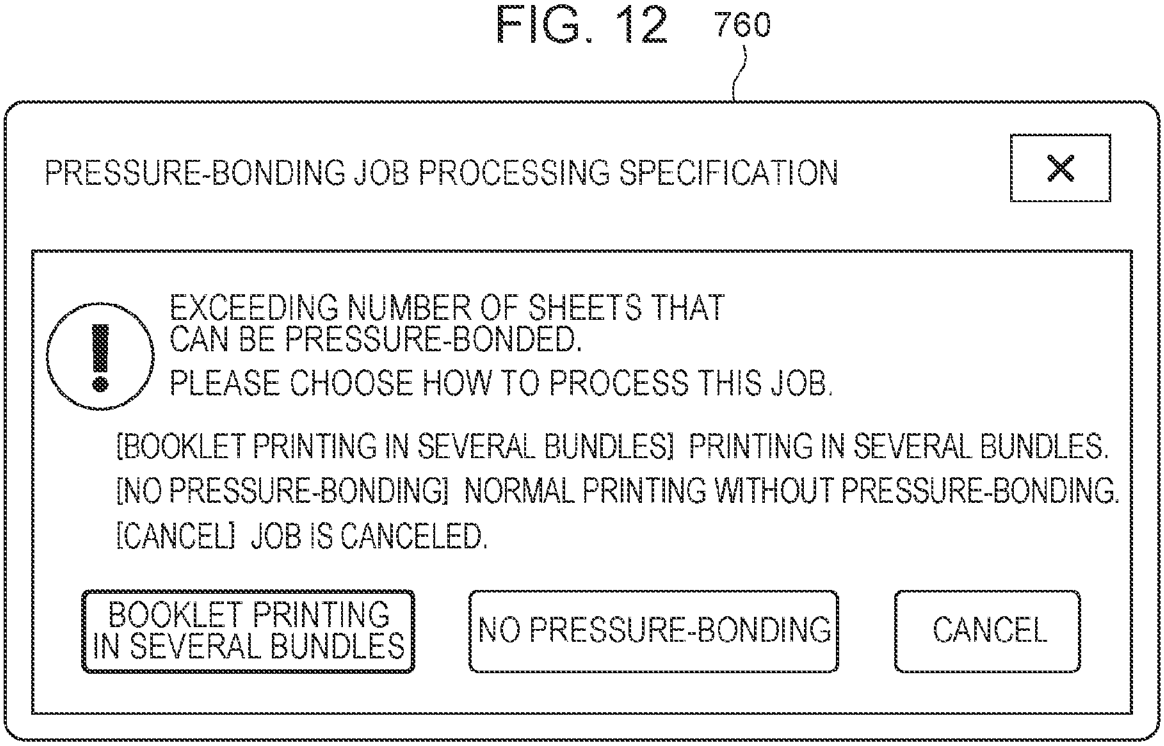
FIG. 12 is a diagram illustrating a screen for specifying job processing when exceeding the upper limit number of pressure-bonded sheets according to the second embodiment.

If it is determined in S924 that the number of sheets (SJ) of the print job is greater than the maximum number of sheets (Mn), the CPU 21 applies control to display, on the display 25, a pressure-bonding job processing specification dialog (760) illustrated in FIG. 12 (S925). In the pressure-bonding job processing specification dialog (760) illustrated in FIG. 12, at the same time as notifying the user that the number of sheets of the print job exceeds the number of sheets that can be pressure-bonded together, the user is queried about what kind of processing to apply to this job. Here, the user chooses one of the following three printing instructions: “booklet printing in several bundles”, which involves printing in several bundles; “no pressure-bonding”, which is normal printing without pressure-bonding; and “cancel”, which cancels the processing of the print job.

The CPU 21 changes the subsequent processing in response to the user’s instruction in S925 (S926).

If the user selects “booklet printing in several bundles” in S926, the CPU 21 generates printing information including a pressure-bonding command according to the print settings (S927). The generated printing information is sent to the printer main body 1101, which in turn implements the processing previously described using FIG. 9 in the first embodiment. Since the sheet counter (SC) exceeds the maximum number of sheets (Mn), multiple bundles of sheets that have been pressure-bonded together are generated.

If the user selects “no pressure-bonding” in S926, the CPU 21 generates printing information that includes no pressure-bonding command in the print settings (S928). The generated printing information is sent to the printer main body 1101, which in turn no longer pressure-bonds the sheets with printed images.

If the user selects “cancel” in S926, the CPU 21 performs processing to cancel the print job, and generates no printing information (S929).

By performing the processing as described above, even if the upper limit number of sheets that can be pressure-bonded is exceeded, the user can select the processing for the target job, and the desired result can be obtained.

Applying Adhesive Toner Between Bundles

The processing corresponding to “Apply adhesive toner additionally between the bundles during booklet printing in several bundles” (742) illustrated in FIG. 10B will be described.

In the case of applying adhesive toner to the front surface of a sheet, the CPU 200 applies control as follows in the image forming processing of the front surface of the sheet in step (S902) of forming an image on the sheet in FIG. 9. That is, for pages other than the first page, and when the sheet counter (SC) is at zero, the CPU 200 generates image data in such a way that adhesive toner is applied to the location specified under the pressure-bonding position 741.

In addition, in the case of applying adhesive toner to the back surface of a sheet, the CPU 200 applies control as follows in the image forming processing of the back surface of the sheet in step (S902) of forming an image on the sheet in FIG. 9. That is, for pages other than the last page, and when the sheet counter (SC) is equal to the maximum number of sheets (Mn), the CPU 200 generates image data in such a way that adhesive toner is applied to the position on the back surface side corresponding to the location specified under the pressure-bonding position 741.

When applying adhesive toner to both the front and back surfaces of a sheet, it is sufficient to perform the process of applying adhesive toner to the front surface as well as to the back surface as described above.

Having adhesive toner applied between the bundles during booklet printing in several bundles makes it possible to perform thermocompression as an offline process. Therefore, even for a finished product that exceeds the number of sheets that can be processed by the thermocompression unit 1167, it becomes possible to create them as a single bundle with thermocompression applied.

Third Embodiment

In the second embodiment described above, the method has been described in which it is determined, on the PC 100, whether the number of sheets to be printed exceeds the upper limit number of sheets that can be pressure-bonded, and the processing is presented for the case where the upper limit is exceeded. Here, as a third embodiment, an embodiment is described where whether the upper limit number of pressure-bonded sheets is exceeded is determined on the printer main body 1101 side, and printing is processed in accordance with the processing for the case where the preset number of sheets exceeds the upper limit number of pressure-bonded sheets.

Extended Pressure-Bonding Settings

Figure 13:
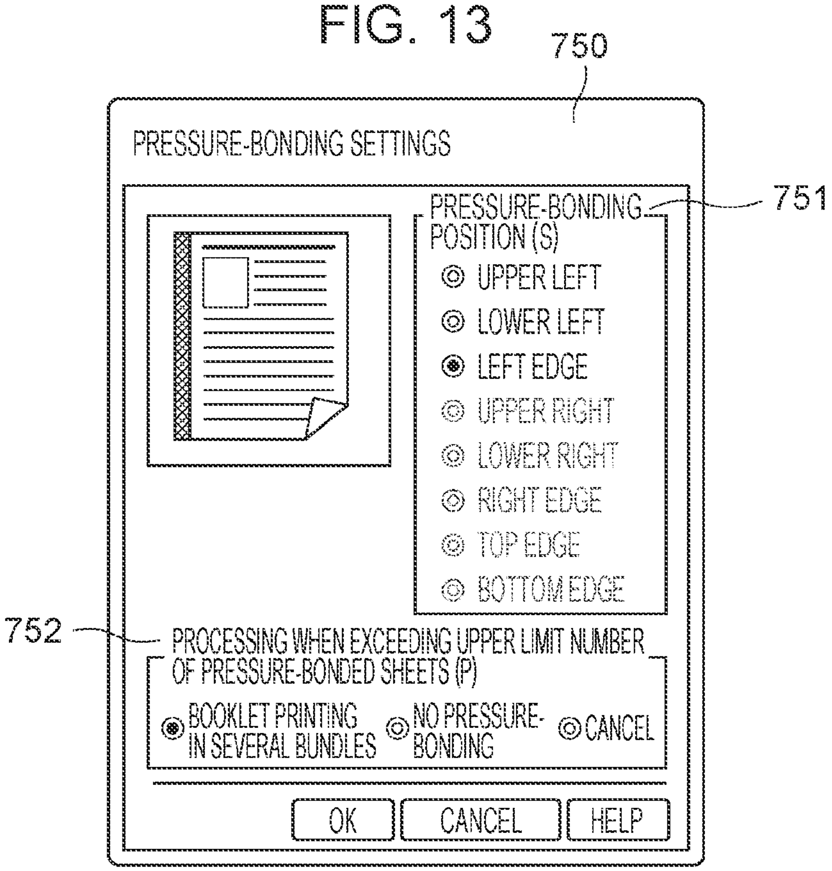
FIG. 13 is a diagram illustrating a pressure-bonding settings screen of the printer driver according to a third embodiment.

FIG. 13 is a diagram illustrating the pressure-bonding settings of the printer driver of the present embodiment, which is a screen displayed on a display device such as the display 25 based on the instructions of the CPU 21 when the user selects pressure-bonding settings 730 illustrated in FIG. 10A using the mouse 27 and/or the keyboard 26. In this screen, under “Processing when exceeding the upper limit number of pressure-bonded sheets” (752), the user can pre-specify the processing for the case where the number of sheets of the print job exceeds the upper limit number of sheets that can be processed by the thermocompression unit 1167. Here, the user selects one of the following three printing instructions: “booklet printing in several bundles”, which involves printing in several bundles; “no pressure-bonding”, which is normal printing without pressure-bonding; and “cancel”, which cancels the processing of the print job. The value selected by the user is sent to the printer main body 1101 as part of the print settings and is used in the print processing. Although the example in which “Processing when exceeding the upper limit number of pressure-bonded sheets” (752) is set on the printer driver on the PC 100 side has been described here, it is permissible to provide “Processing when exceeding the upper limit number of pressure-bonded sheets” as part of the settings on the printer main body 1101 side which is not illustrated.

Figure 14:
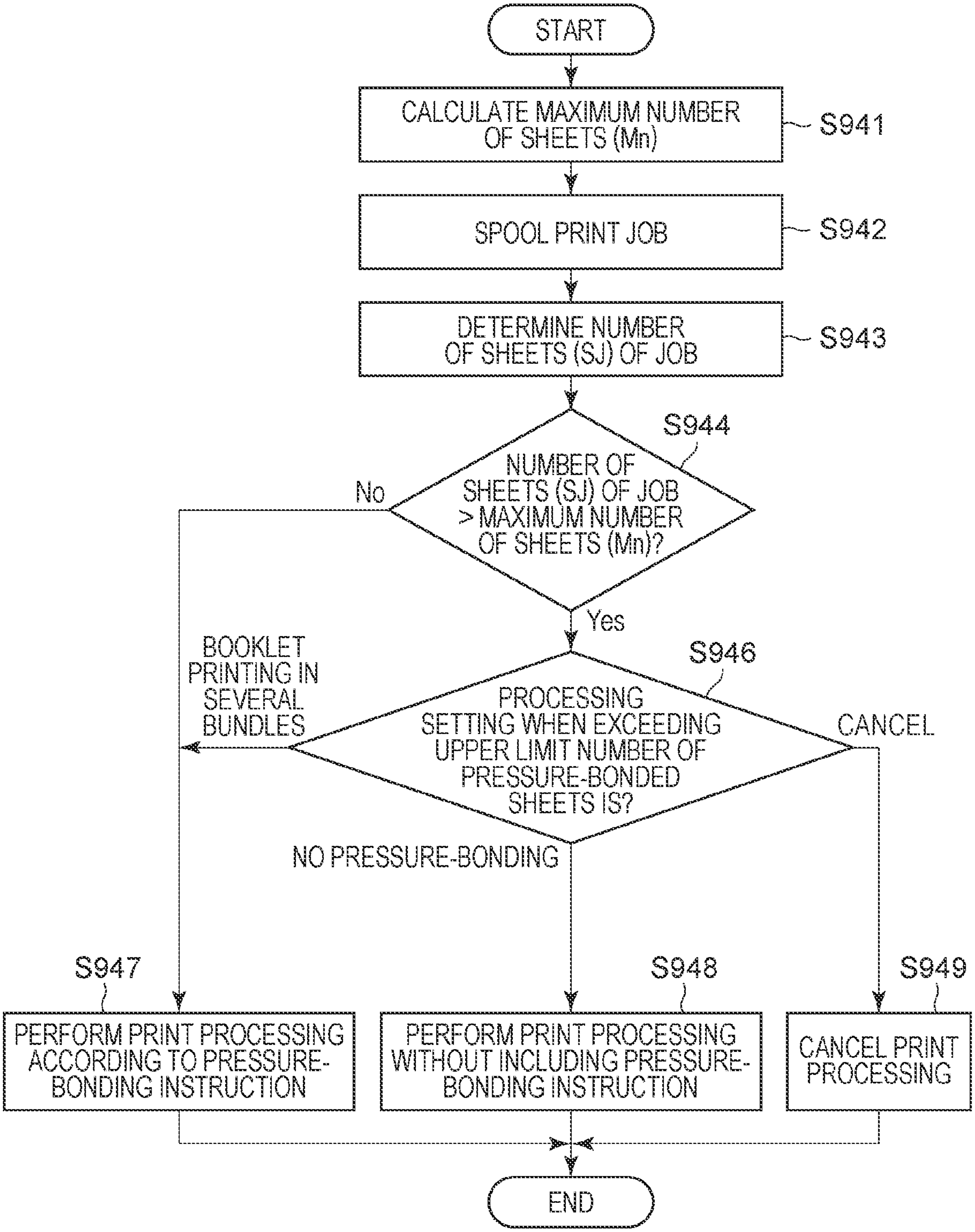
FIG. 14 is a flowchart illustrating the processing of the printer main body according to the third embodiment.

FIG. 14 is a flowchart illustrating the processing of the printer main body 1101 in the present embodiment. This flowchart will be used to describe the processing of the printer main body 1101 in the present embodiment. Note that each step in FIG. 14 is realized by the CPU 200 reading out a program stored in the ROM 201 or the HDD 203 to the RAM 202 and executing it.

Printing information generated by the PC 100 is sent to the printer main body 1101 through the communication line 150 and the network IF 208. After the printing information is stored in the HDD 203 by the CPU 200, a printing operation is initiated by the CPU 200.

First, the CPU 200 determines the maximum number of sheets (Mn) constituting a single booklet based on information included in the printing information, such as the sheet type used for printing and the performance or capacity of the thermocompression unit 1167 of the sheet processing apparatus 1106 (S941). For example, if the sheets used for printing are plain paper, the CPU 21 determines the maximum number of sheets to be 100 sheets. In the meantime, if the sheets used for printing are cardstock, the CPU 200 determines the maximum number of sheets to be 80 sheets. These may be determined by storing the maximum number of sheets for each paper type in the HDD 203 and allowing the CPU 200 to refer to it. This maximum number of sheets is the upper limit value of the number of sheets that can be output in one batch after pressure-bonding the sheets together multiple times.

Thereafter, the CPU 200 counts the number of pages based on the printing information and temporarily stores it in the HDD 203 (S942) to determine the number of sheets (SJ) of the printing information (S943), and compares the value of the maximum number of sheets (Mn) with the value of the number of sheets (SJ) of the printing information (S944).

If the number of sheets (SJ) of the printing information is less than or equal to the maximum number of sheets (Mn), the CPU 200 performs pressure-bonding processing according to the print settings (S947). Here, the processing described using FIG. 9 in the first embodiment is implemented. Since the sheet counter (SC) never exceeds the maximum number of sheets (Mn), a single bundle of sheets that have been pressure-bonded together is generated.

If it is determined in S944 that the number of sheets (SJ) of the printing information is greater than the maximum number of sheets (Mn), the CPU 200 switches the subsequent processing by referring to the setting value under "Processing when exceeding the upper limit number of pressure-bonded sheets" (752) included in the printings settings (S946).

If "booklet printing in several bundles" is specified under "Processing when exceeding the upper limit number of pressure-bonded sheets" (752), the CPU 200 performs the pressure-bonding processing according to the print settings (S947). Here again, the processing described using FIG. 9 in the first embodiment is implemented. Since the sheet counter (SC) exceeds the maximum number of sheets (Mn), multiple bundles of sheets that have been pressure-bonded together are generated.

If "no pressure-bonding" is specified under "Processing when exceeding the upper limit number of pressure-bonded sheets" (752), the CPU 200 allows the print processing to proceed with the setting of a pressure-bonding instruction removed from the print settings, and creates a printed material where no pressure-bonding has been performed (S948).

If "Cancel" is specified under "Processing when exceeding the upper limit number of pressure-bonded sheets" (752), the CPU 200 performs processing to cancel the print processing, and no printed material is generated (S949).

By performing the processing as described above, it becomes possible to pre-set the processing for the case where the upper limit number of sheets that can be pressure-bonded is exceeded, and the user has the advantage of obtaining the desired result.

Note that, instead of pre-specifying what to do under "Processing when exceeding the upper limit number of pressure-bonded sheets" (752), the following control may be applied. For example, if it is determined in S944 that the number of sheets (SJ) of the printing information is greater than the maximum number of sheets (Mn), the CPU 200 may cause the operation unit 205 to display a screen corresponding to the dialog illustrated in FIG. 12. In addition, if it is determined in this screen in S944 that the number of sheets (SJ) of the printing information is greater than the maximum number of sheets (Mn), the CPU 200 may notify the PC 100 of this fact. Having received the notification, the CPU 21 of the PC 100 may then cause the display 25 to display the screen illustrated in FIG. 12 based on the notification. Then, in response to the content selected by the user through the screen, the image forming apparatus 1100 may output a plurality of sheets in multiple sheet bundles, output the sheets without performing pressure-bonding, or cancel the print job.

Although an example in which toner is used as an example of a recording agent for pressure-bonding has been described in the above embodiments, a recording agent other than toner, such as ink, may be used as long as it has an adhesive force.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2023-058257, filed Mar. 31, 2023, which is hereby incorporated by reference herein in its entirety.

What is claimed is:

1. A sheet processing system comprising:

a printing unit;

a conveyance unit configured to convey a plurality of sheets on which images are printed by the printing unit;

a stacking unit configured to stack the plurality of sheets;

an alignment unit configured to align the stacked plurality of sheets;

an adhesion unit configured to adhere, with a recording agent applied on at least one sheet included in the plurality of sheets by the printing unit, an edge of the stacked plurality of sheets; and a control unit configured to apply control to adhere, using the adhesion unit, an additional sheet conveyed by the conveyance unit to a first sheet bundle including the plurality of sheets adhered by the adhesion unit, wherein the control unit is further configured to count a number of sheets included in a second sheet bundle generated by adhering at least one additional sheet to the first sheet bundle using the adhesion unit, wherein, in a case where a sheet to be processed remains after the second sheet bundle and the counted number will reach an upper limit number of sheets that can be output as one adhered sheet bundle, the control unit is configured to control the printing unit to apply, when an image is printed on a last sheet of the at least one additional sheet, the recording agent to a last sheet of the second sheet bundle at a position for adhering the second sheet bundle to a subsequent sheet bundle, and wherein, in a case where the counted number reaches the upper limit number, the control unit is configured to cause the second sheet bundle to be discharged.

2. The sheet processing system according to claim 1, wherein the upper limit number of sheets is a maximum number of sheets that can be output in one batch.

3. The sheet processing system according to claim 2, wherein the control unit is further configured to determine whether a number of sheets to be printed exceeds the upper limit number of sheets, and wherein the control unit is further configured to cause a display unit to display a screen for allowing a user to specify a control method based on a determination made by the determination unit that the number of sheets to be printed exceeds the upper limit number of sheets.

4. The sheet processing system according to claim 3, wherein, in the screen, an instruction to generate a plurality of sheet bundles generated by the process is selectable as the control method.

5. The sheet processing system according to claim 3, wherein, in the screen, an instruction to output the plurality of sheets without performing adhesion is selectable as the control method.

6. The sheet processing system according to claim 3, wherein, in the screen, an instruction to cancel a job of printing an image on each sheet is selectable as the control method.

7. The sheet processing system according to claim 1, wherein the adhesion is performed by applying the recording agent to each sheet and heating and pressurizing the recording agent.

8. The sheet processing system according to claim 7, wherein the recording agent is additionally used by the printing unit for printing the image.

9. The sheet processing system according to claim 7, wherein the recording agent is an adhesive recording agent that is not used by the printing unit for printing the image.

10. The sheet processing system according to claim 1, wherein, in a case where the counted number will not reach an upper limit number of sheets, the control unit is configured not to control the printing unit to apply, when an image is printed on the last sheet of the at least one additional sheet, the recording agent to the last sheet of the second sheet bundle at a position for adhering the second sheet bundle to a subsequent sheet bundle.

11. The sheet processing system according to claim 1, wherein the control unit is further configured to determine the upper limit number based on a species of the sheet to be printed and capacity of the adhesion unit.

12. The sheet processing system according to claim 1, wherein the control unit is further configured to count a number of sheets and compare the counted number of sheets with the upper limit number every time an image is printed on a sheet by the printing unit.

13. The sheet processing system according to claim 1, wherein the control unit is further configured to generate, based on one set of printing information, a single print job including generation of a plurality of adhered sheet bundles.

14. The sheet processing system according to claim 1, wherein the control unit is further configured to control the printing unit to apply the recording agent to the last sheet of the second sheet bundle in response to a print setting indicating that the recording agent is to be additionally applied.

15. The sheet processing system according to claim 1, wherein the control unit is further configured to control the printing unit to apply, when an image is printed on the last sheet of the second sheet bundle, the recording agent to a back surface of the last sheet of the second sheet bundle, and to apply, when an image is printed on a first sheet of the subsequent sheet bundle, the recording agent to a front surface of the first sheet of the subsequent sheet bundle.

16. A method for controlling a sheet processing system, the method comprising:

conveying a plurality of sheets on which images are printed by a printing unit;

stacking the plurality of sheets;

aligning the stacked plurality of sheets;

adhering, with a recording agent applied on at least one sheet included in the plurality of sheets by the printing unit, an edge of the stacked plurality of sheets conveyed in the conveying; and applying control to adhere an additional sheet conveyed in the conveying to a first sheet bundle including the stacked plurality of sheets adhered in the adhering, wherein counting a number of sheets included in a second sheet bundle generated by adhering at least one additional sheet to the first sheet bundle, wherein, in a case where a sheet to be processed remains after the second sheet bundle and the counted number will reach an upper limit number of sheets that can be output as one adhered sheet bundle, control the printing unit to apply, when an image is printed on a last sheet of the at least one additional sheet, the recording agent to a last sheet of the second sheet bundle at a position for adhering the second sheet bundle to a subsequent sheet bundle, and wherein, in a case where the counted number reaches the upper limit number, cause the second sheet bundle to be discharged.

17. A non-transitory computer-readable storage medium storing a program for causing a computer to execute a method for controlling a sheet processing system, the method comprising:

conveying a plurality of sheets on which images are printed by a printing unit;

stacking the plurality of sheets;

aligning the stacked plurality of sheets;

adhering, with a recording agent applied on at least one sheet included in the plurality of sheets by the printing unit, an edge of the stacked plurality of sheets conveyed in the conveying; and applying control to adhere an additional sheet conveyed in the conveying to a first sheet bundle including the stacked plurality of sheets adhered in the adhering, wherein counting a number of sheets included in a second sheet bundle generated by adhering at least one additional sheet to the first sheet bundle, wherein, in a case where a sheet to be processed remains after the second sheet bundle and the counted number will reach an upper limit number of sheets that can be output as one adhered sheet bundle, control the printing unit to apply, when an image is printed on a last sheet of the at least one additional sheet, the recording agent to a last sheet of the second sheet bundle at a position for adhering the second sheet bundle to a subsequent sheet bundle, and wherein, in a case where the counted number reaches the upper limit number, cause the second sheet bundle to be discharged.

* * * * *